United States Patent
Sylvia

(10) Patent No.: US 7,390,003 B1
(45) Date of Patent: Jun. 24, 2008

(54) STEP APPARATUS FOR A TRAILER AND METHOD

(76) Inventor: Antone Sylvia, 2134 Navajo Ct., Oakdale, CA (US) 95361

( * ) Notice: Subject to any disclaimer, the term of this patent is extended or adjusted under 35 U.S.C. 154(b) by 380 days.

(21) Appl. No.: 11/294,106

(22) Filed: Dec. 6, 2005

(51) Int. Cl.
*B60R 3/02* (2006.01)
(52) U.S. Cl. ........................ 280/166; 280/163
(58) Field of Classification Search ............ 280/163, 280/166, 169; 403/94, 165, 361, 383, 364, 403/381
See application file for complete search history.

(56) References Cited

U.S. PATENT DOCUMENTS

| | | | | |
|---|---|---|---|---|
| 817,969 | A * | 4/1906 | Galbraith | 248/289.11 |
| 2,764,422 | A | 9/1956 | McDonald | |
| 3,329,443 | A * | 7/1967 | Lowder et al. | 280/166 |
| 3,627,350 | A * | 12/1971 | Cross | 280/166 |
| 3,912,299 | A * | 10/1975 | Carr | 280/166 |
| 4,056,270 | A | 11/1977 | Greenfield | |
| 4,632,195 | A * | 12/1986 | Emmerich | 175/320 |
| 4,943,076 | A * | 7/1990 | Tripke | 280/166 |
| 5,152,631 | A * | 10/1992 | Bauer | 403/372 |
| D371,336 | S | 7/1996 | Wilson | |
| 5,816,616 | A | 10/1998 | Boyd | |
| 5,897,125 | A * | 4/1999 | Bundy | 280/166 |
| 6,471,002 | B1 | 10/2002 | Weinerman | |
| 6,986,523 | B1 * | 1/2006 | Bickford | 280/414.1 |

* cited by examiner

*Primary Examiner*—Christopher P. Ellis
*Assistant Examiner*—John D Walters

(57) ABSTRACT

A step apparatus for a trailer includes a rod that has a first end and a second end. The rod has a bend therein positioned between the first and second ends so that a first portion and a second portion of the rod is defined. A bracket is configured to be releasably securable to a trailer arm. A pair of plates is attached to and extends outwardly from the bracket. Each of the plates has an aperture extending therethrough. The apertures are aligned with each other. A rigid panel has a top side and a bottom side. A plurality of fasteners is provided. Each of the fasteners is extendable through the panel and into one of a plurality of openings extending through the first portion. The bracket is attached to the trailer arm so that the plates are horizontally orientated. The second portion is extended through the apertures.

9 Claims, 6 Drawing Sheets

STEP APPARATUS FOR A TRAILER AND METHOD

BACKGROUND OF THE INVENTION

1. Field of the Invention

The present invention relates to step devices and more particularly pertains to a new step device for which may be positioned on a trailer to aid a person reaching into an article, such as a boat, that is positioned on the trailer.

2. Description of the Prior Art

The use of step devices is known in the prior art. U.S. Pat. No. 3,912,299 describes a step that is attached to a trailer and which may be selectively extended outwardly from the trailer. Another type of step device is U.S. Pat. No. 4,056,270 having a panel that is removably attachable to a trailer that is used as a step on the trailer. Still yet another such device is found in U.S. Pat. No. 4,943,076 that is again removably positionable on a trailer.

While these devices fulfill their respective, particular objectives and requirements, the need remains for a device that is easily attachable to existing trailers and which will function as a step for a person who is attempting to reach into a boat or other article positioned on the trailer. Additionally, the device should be adjustable so that it may be positionable in a stored position when not in use without having to remove the device from the trailer. Finally, the device should be easily retrofittable to existing trailers.

SUMMARY OF THE INVENTION

The present invention meets the needs presented above by generally comprising a rod that has a first end and a second end. The rod has a bend therein positioned between the first and second ends. A first portion of the rod is defined between the first end and the bend and a second portion of the rod is defined between the bend and the second end. The bend is a generally perpendicular bend. A bracket is configured to be releasably securable to a trailer arm. A pair of plates is attached to and extends outwardly from the bracket. The plates are spaced from each other. Each of the plates has an aperture extending therethrough configured for removably receiving the second portion of the rod. The apertures are aligned with each other. A rigid panel has a top side and a bottom side. A plurality of fasteners is provided. Each of the fasteners is extendable through the panel and into one of a plurality of openings extending through the first portion. The bracket is attached to the trailer arm so that the plates are horizontally orientated. The second portion is extended through the apertures. The second portion is extended outwardly from the trailer to define a step position or positioned adjacent to and extending along the trailer to define a stored position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
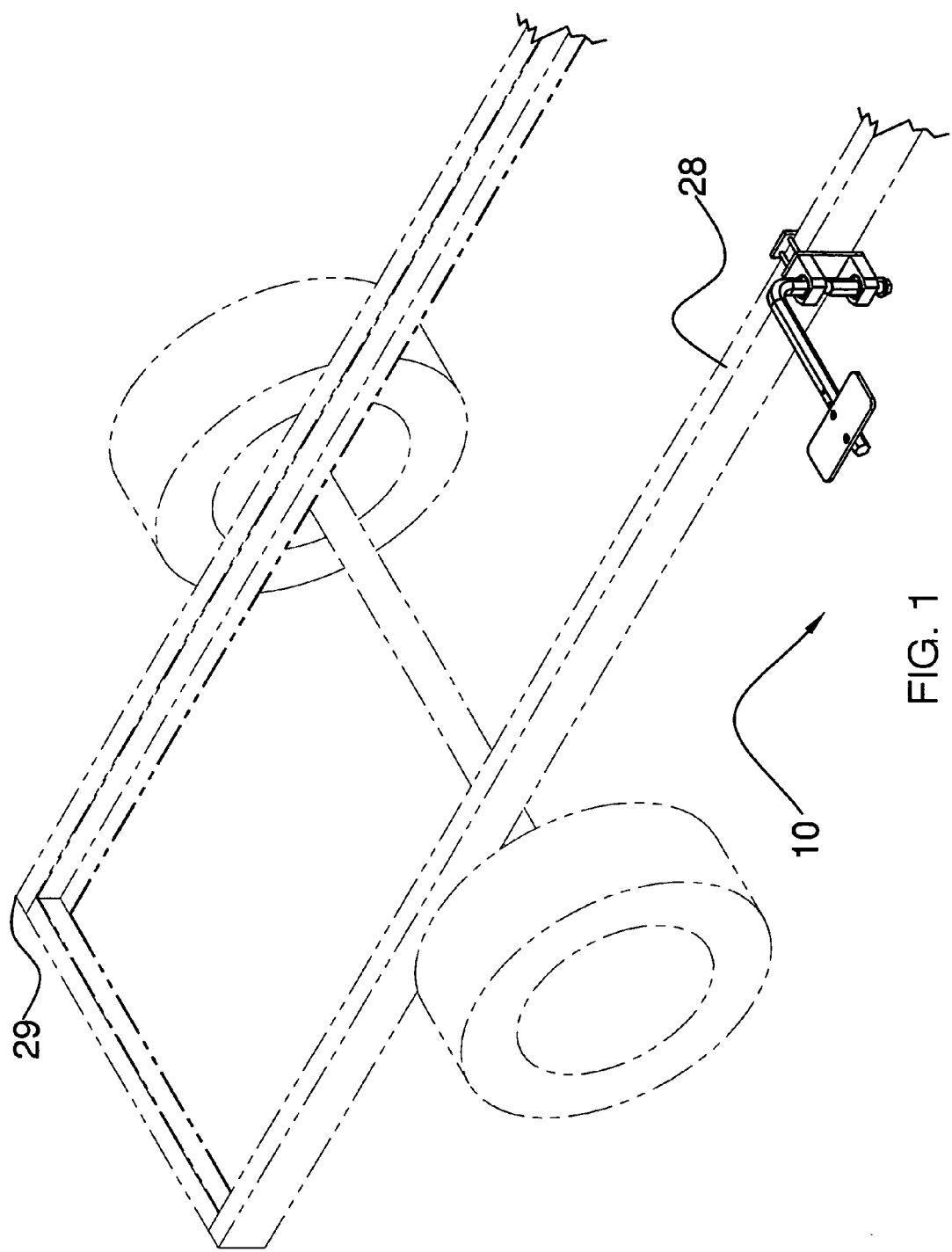
FIG. 1 is a perspective view of a step apparatus for a trailer and method according to the present invention.
Figure 2:
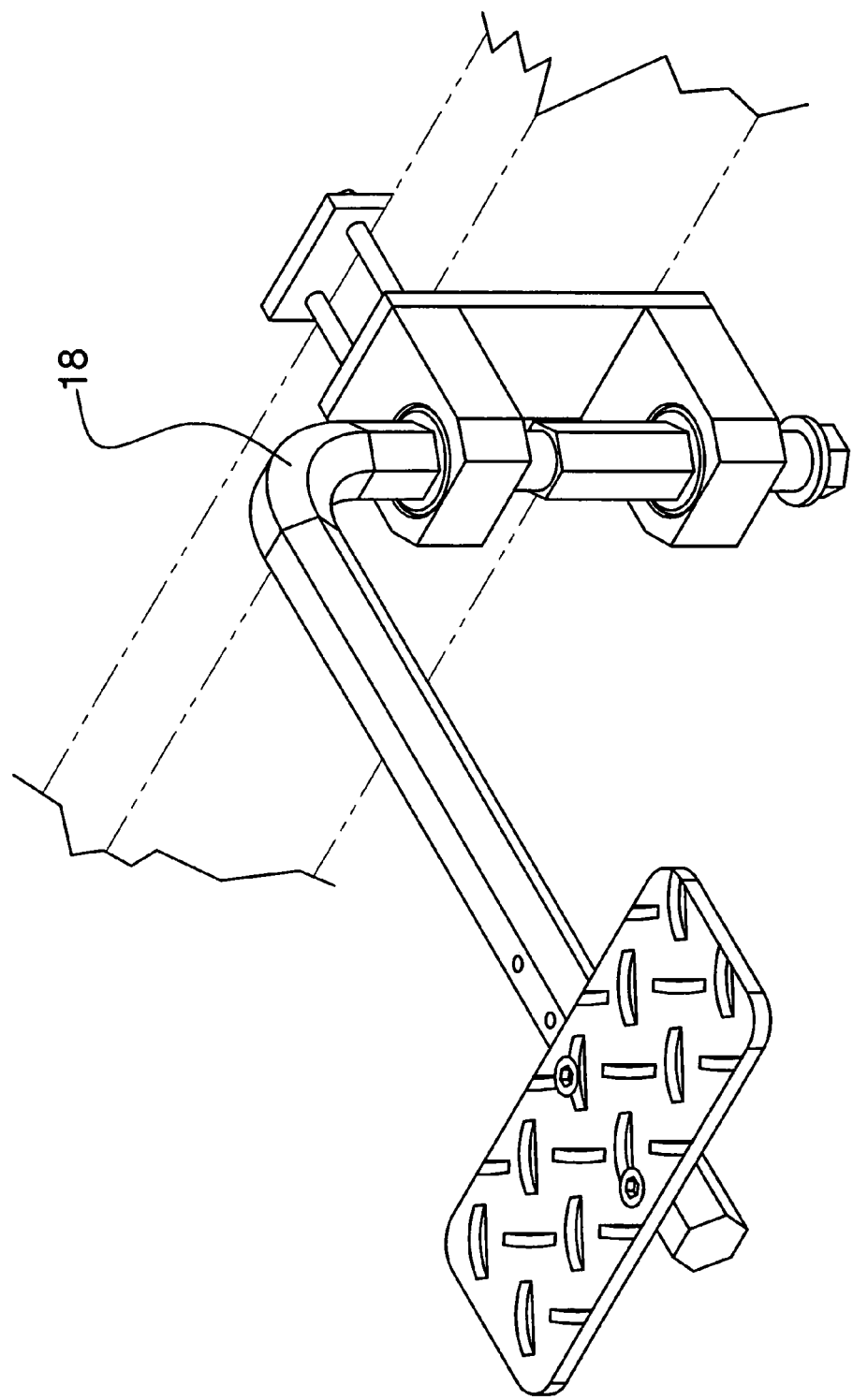
FIG. 2 is a perspective view of the present invention.
Figure 3:
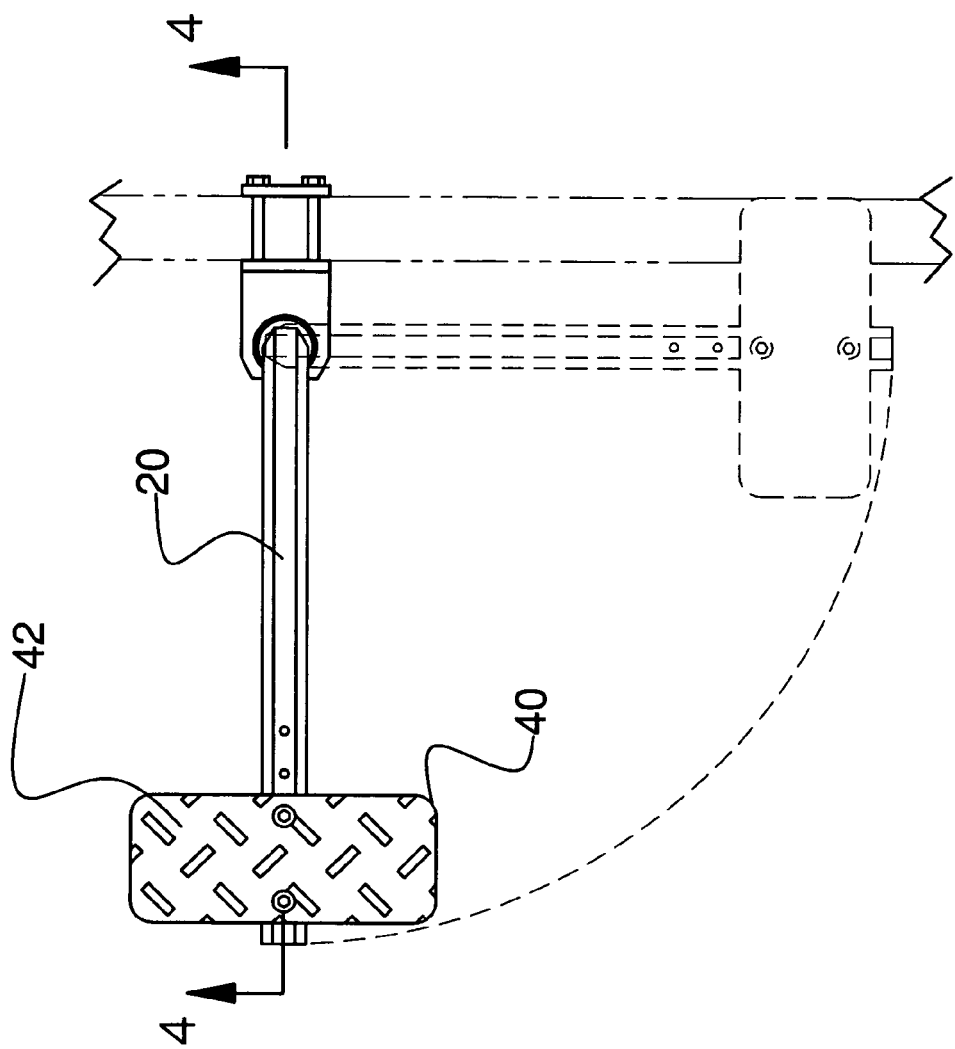
FIG. 3 is a top view of the present invention.
Figure 4:
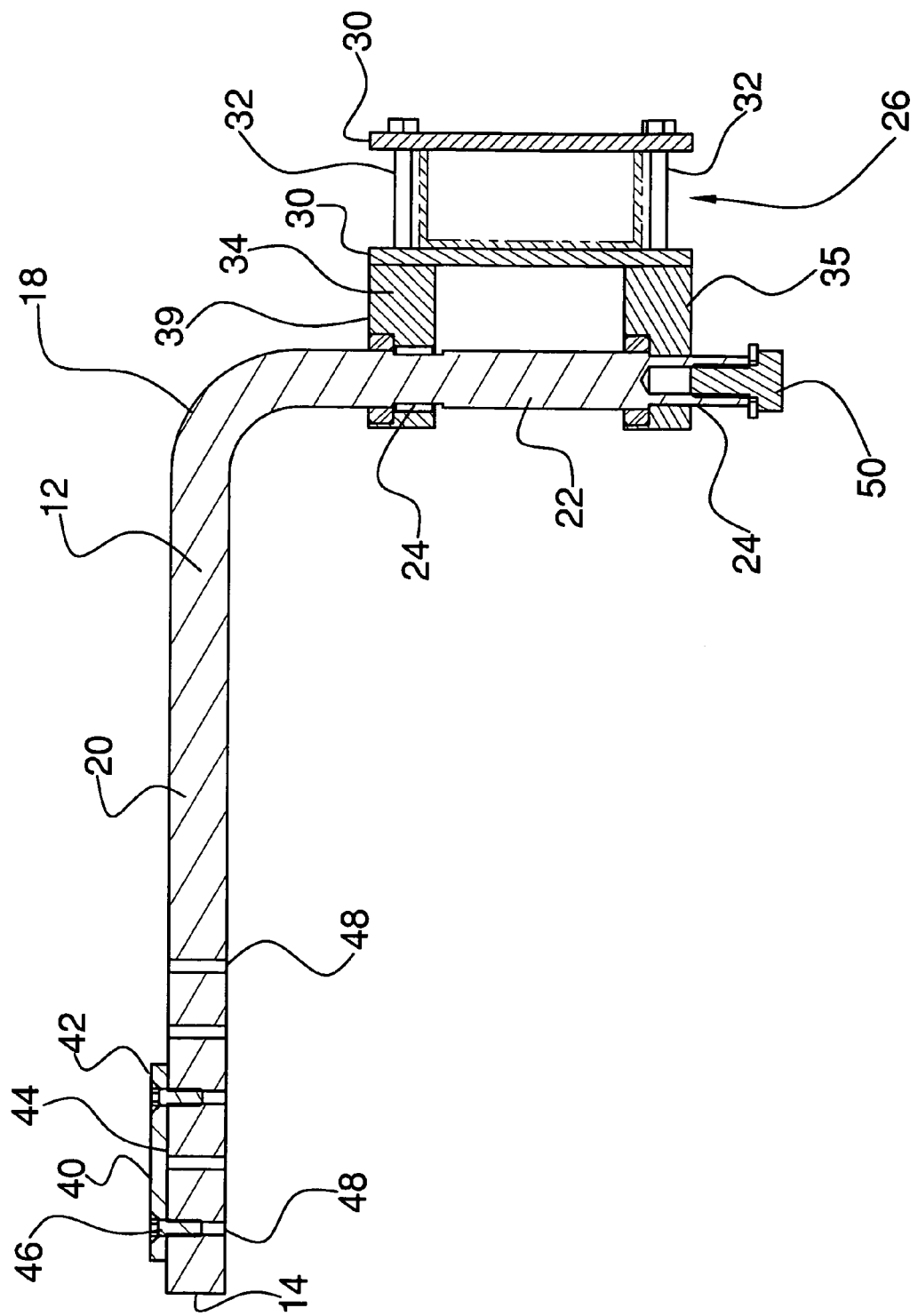
FIG. 4 is a cross-sectional view taken along line 4-4 of FIG. 3 of the present invention.
Figure 5:
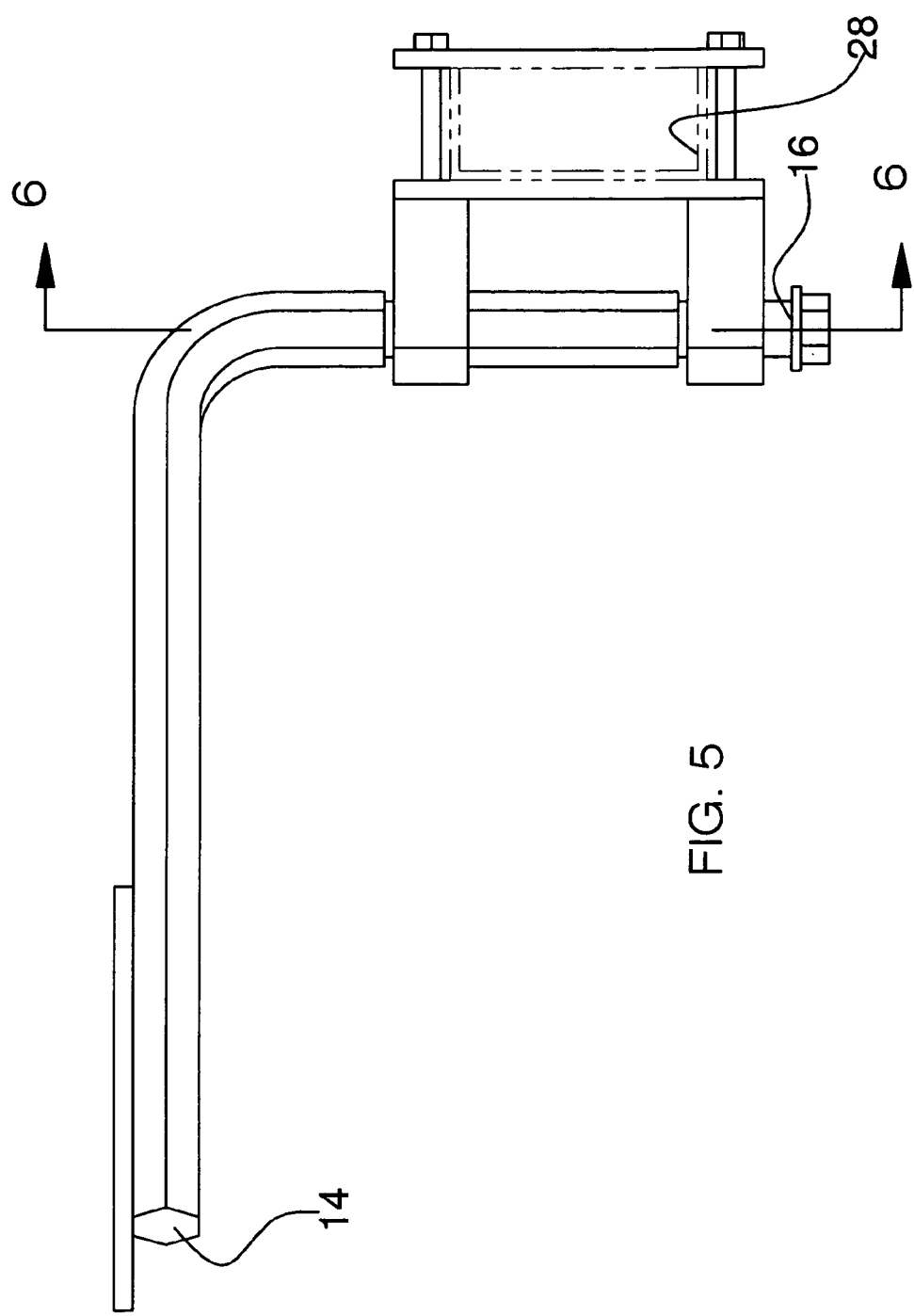
FIG. 5 is a side perspective view of the present invention.
Figure 6:
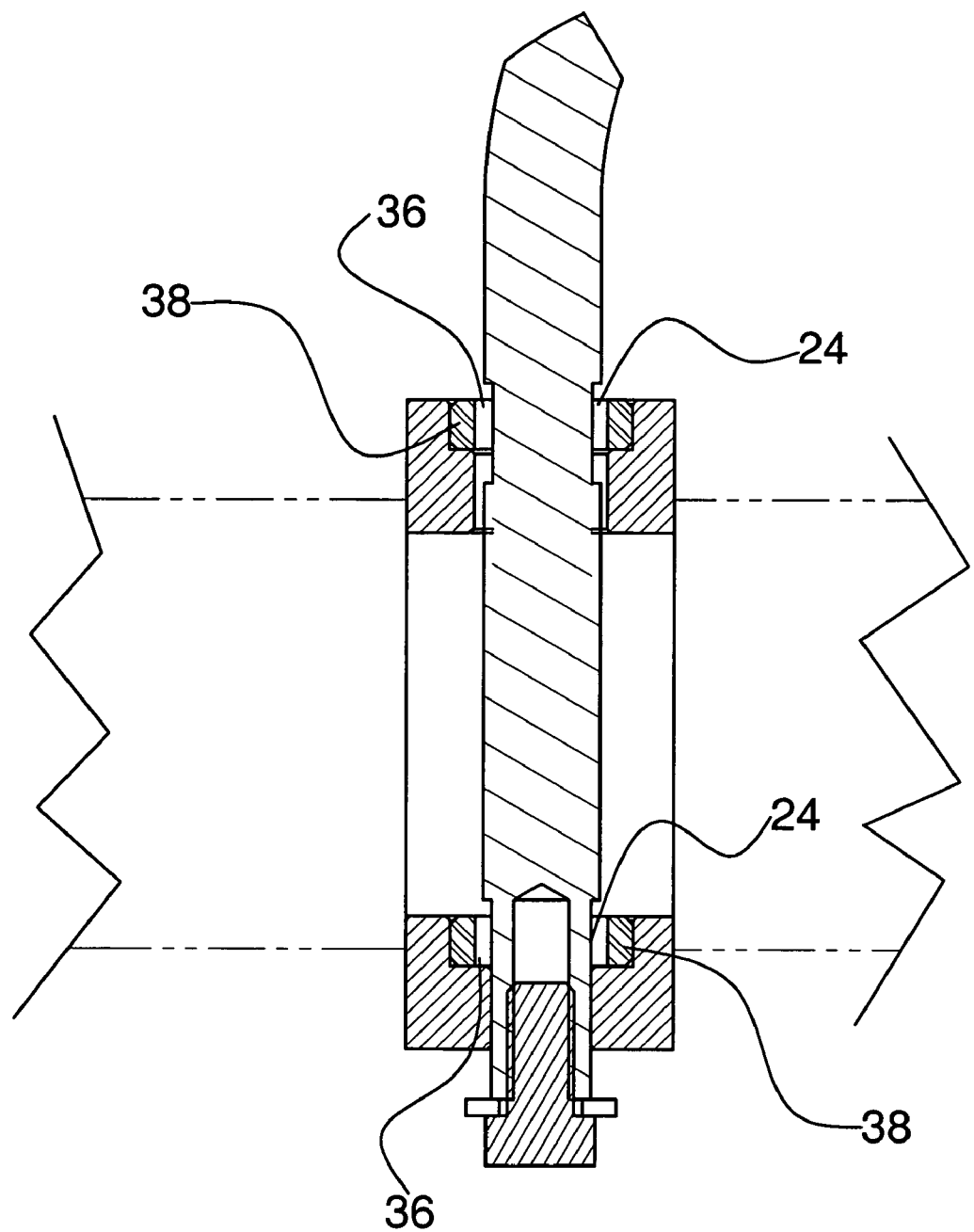
FIG. 6 is a cross-sectional view taken along line 6-6 of FIG. 5 of the present invention.

With reference now to the drawings, and in particular to FIGS. 1 through 6 thereof, a new step device embodying the principles and concepts of the present invention and generally designated by the reference numeral 10 will be described.

As best illustrated in FIGS. 1 through 6, the step apparatus for a trailer and method 10 generally comprises a rod 12 that has a first end 14 and a second end 16. The rod 12 has a bend 18 therein positioned between the first 14 and second 16 ends. A first portion 20 of the rod 12 is defined between the first end 14 and the bend 18. A second portion 22 of the rod 12 is defined between the bend 18 and the second end 16. The bend 18 is a generally perpendicular bend. The first portion 20 has a length from the first end 14 to the bend 18 generally between 10 inches and 18 inches. The second end 16 has a length generally between 6 inches and 10 inches. The second portion 22 of the rod 12 has a peripheral surface comprising a plurality of planar sides. A cross-section of the second portion 22 taken perpendicular to a longitudinal axis of the second portion 22 has a generally hexagonal shape. The second portion 22 has a pair of annular depressions 24 therein. The depressions 24 are spaced from each other. One of the annular depressions 24 is positioned adjacent to the second end 16.

A bracket 26 is configured to be releasably securable to a trailer arm 28. The bracket is a conventional bracket 26 including a pair of planar members 30 secured together with a plurality of posts 32. The arm 28 is positioned between the posts 32. A pair of plates 34, 35 is attached to and extends outwardly from the bracket 26. The plates 34 are spaced from each other. Each of the plates 34, 35 has an aperture 36 extending therethrough configured for removably receiving the second portion 22 of the rod 12. Each of the apertures 36 has a locking nut 38 positioned therein. The locking nuts 38 each have an inner perimeter has a size and shape substantially equal to an outer perimeter of the second portion 22. The plates 34, 35 are spaced apart equal to a distance between the annular depressions 24. The second portion 22 is rotatable with respect to the plates 34, 35 when the annular depressions 24 are positioned in the locking nut 38. A lower section of the aperture 36 in a lower one of the plates 35 has a same shape and size of the annular depressions 24. An upper one of the plates 34 has an upper surface 39 that is horizontally parallel with an upper edge of the bracket 26.

A rigid panel 40 has a top side 42 and a bottom side 44. The panel 40 has a length and a width each generally between 3 inches and 10 inches. A plurality of fasteners 46 is provided. Each of the fasteners 46 is extendable through the panel 40 and into one of a plurality of openings 48 extending through the first portion 20. The openings 48 are orientated parallel with the longitudinal axis of the second portion 20. The panel 40 can be selectively positioned along a length of the first portion 20.

In use, the bracket 26 is attached to an arm 28 of a trailer 29 so that the plates 34, 35 are horizontally orientated. The second portion 22 is extended through the apertures 36. The second portion 22 is extended outwardly from the trailer 29 to define a step position or the second portion 22 may be extended adjacent to and along the trailer 29 to define a stored position. The locking nuts 38 allow the second portion to be secured in a selected position. The annular depressions 24, when moved into the area bounded by the locking nuts 38, allow the second portion 22 to freely rotate with respect to the plates 24, 25. A coupler 50 may be attached to the second end 16 to prevent the second portion 22 from being removed from the plates 34, 35.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of positioning a step on a trailer comprising the steps of:
   providing a rod having a first end and a second end, said rod having a bend therein positioned between said first and second ends, a first portion of said rod being defined between said first end and said bend, a second portion of said rod being defined between said bend and said second end, said bend being a generally perpendicular bend;
   providing a bracket configured to be releasably secured to a trailer arm, a pair of plates being attached to and extending outwardly from said bracket, said plates being spaced from each other, each of said plates having an aperture extending therethrough configured for removably receiving said second portion of said rod, said apertures being aligned with each other;
   providing a rigid panel having a top side and a bottom side;
   providing a plurality of fasteners, each of said fasteners being extendable through said panel and into one of a plurality of openings extending through said first portion;
   attaching said bracket to the trailer arm so that said plates are horizontally orientated;
   extending said second portion through said apertures; and
   extending said second portion outwardly from the trailer to define a step position or positioning said second portion adjacent to and extending along the trailer to define a stored position.

2. The method according to claim 1, wherein said first portion has a length from said first end to said bend generally between 10 inches and 18 inches, said second end having a length generally between 6 inches and 10 inches.

3. The method according to claim 1, wherein:
   a cross-section of said second portion taken perpendicular to a longitudinal axis of said second portion has a generally hexagonal shape, said second portion having a pair of annular depressions therein, said depressions being spaced from each other, one of said annular depressions being positioned adjacent to said second end; and
   each of said apertures has a locking nut positioned therein, each of said locking nuts having an inner perimeter having a size and shape substantially equal to an outer perimeter of said second portion, said plates being spaced apart equal to a distance between said annular depressions, said second portion being rotatable with respect to said plates when said annular depressions are positioned in said locking nut.

4. The method according to claim 3, wherein a lower section of said aperture in a lower one of said plates has a same shape and size of said annular depressions.

5. The method according to claim 4, wherein an upper one of said plates has an upper surface being horizontally parallel with an upper edge of said bracket.

6. The method according to claim 1, wherein an upper one of said plates has an upper surface being horizontally parallel with an upper edge of said bracket.

7. The method according to claim 1, wherein said panel has a length and a width each generally between 3 inches and 10 inches.

8. The method according to claim 2, wherein said panel has a length and a width each generally between 3 inches and 10 inches.

9. A method of positioning a step on a trailer comprising the steps of:
   providing a rod having a first end and a second end, said rod having a bend therein positioned between said first and second ends, a first portion of said rod being defined between said first end and said bend, a second portion of said rod being defined between said bend and said second end, said bend being a generally perpendicular bend, said first portion having a length from said first end to said bend generally between 10 inches and 18 inches, said second end having a length generally between 6 inches and 10 inches, said second portion of said rod having a peripheral surface comprising a plurality of planar sides, a cross-section of said second portion taken perpendicular to a longitudinal axis of said second portion having a generally hexagonal shape, said second portion having a pair of annular depressions therein, said depressions being spaced from each other, one of said annular depressions being positioned adjacent to said second end;
   providing a bracket configured to be releasably secured to a trailer arm, a pair of plates being attached to and extending outwardly from said bracket, said plates being spaced from each other, each of said plates having an aperture extending therethrough configured for removably receiving said second portion of said rod, each of said apertures having a locking nut positioned therein, each of said locking nuts having an inner perimeter having a size and shape substantially equal to an outer perimeter of said second portion, said plates being spaced apart equal to a distance between said annular depressions, said second portion being rotatable with respect to said plates when said annular depressions are positioned in said locking nut, a lower section of said aperture in a lower one of said plates having a same shape and size of said annular depressions, an upper one of said plates having an upper surface being horizontally parallel with an upper edge of said bracket;

providing a rigid panel having a top side and a bottom side, said panel having a length and a width each generally between 3 inches and 10 inches;

providing a plurality of fasteners, each of said fasteners being extendable through said panel and into one of a plurality of openings extending through said first portion, said openings each being orientated parallel with said longitudinal axis of said second portion;

attaching said bracket to the trailer arm so that said plates are horizontally orientated;

extending said second portion through said apertures; and extending said second portion outwardly from the trailer to define a step position or positioning said second portion adjacent to and extending along the trailer to define a stored position.

* * * * *